United States Patent
Rimmer et al.

[11] 3,977,772
[45] Aug. 31, 1976

[54] APODIZED OPTICAL SYSTEM

[75] Inventors: Matthew P. Rimmer, Bedford; John M. Vanderhoff, Acton, both of Mass.

[73] Assignee: Itek Corporation, Lexington, Mass.

[22] Filed: June 21, 1974

[21] Appl. No.: 481,588

[52] U.S. Cl. .................................. 350/205; 350/17; 350/162 R; 350/293
[51] Int. Cl.² .......................................... G02B 5/00
[58] Field of Search .......... 350/17, 205, 206, 162 R, 350/162 SF, 293; 354/296

[56] References Cited
UNITED STATES PATENTS

| 363,961 | 5/1887 | Kuhn | 354/296 |
| 1,062,247 | 5/1913 | Moine | 354/296 |
| 3,634,219 | 1/1972 | Sinai | 350/205 X |

OTHER PUBLICATIONS
"A Coronagraph Improvement," *Sky And Telescope*, vol. XXIV, No. 4, Oct. 1962, p. 197.

*Primary Examiner*—John K. Corbin
*Attorney, Agent, or Firm*—Homer O. Blair; Robert L. Nathans; Gerald H. Glanzman

[57] ABSTRACT

A telescopic optical system adapted to form an image of an object of interest which is only slightly angularly displaced in space from a bright object such as the sun. The optical system is pointed directly at the object of interest such that the geometrical image of the sun is not within its field of view. However, radiation from the sun is of such great intensity that radiation diffracted into the optical system may be many times greater than radiation forming the image of interest. In the preferred embodiment the image of interest is positioned beyond the hundredth diffraction ring of the sun. Undesired diffracted radiation is substantially reduced by apodizing the edge of the entrance aperture to the optical system to change the diffraction pattern of the solar radiation. In a first embodiment, the edge of the entrance aperture is apodized by placing a saw tooth pattern along selected edges of the aperture. In a second embodiment the aperture is apodized by modifying the transmission along selected aperture edges to proceed to zero smoothly in a small but finite distance.

5 Claims, 9 Drawing Figures

APODIZED OPTICAL SYSTEM

BACKGROUND OF THE INVENTION

The present invention relates generally to telescopic optical systems and more particularly relates to a telescopic optical system designed to be pointed at an object of interest which is only slightly angularly displaced in space from the sun. When the object of interest is near the sun, such as within 1° of the sun's limb, and even when the sun is out of the field of view of the optical system, solar radiation diffracted into the optical system can be substantially more powerful than radiation forming the image of interest. In the problem which resulted in the present invention, a reduction of 5,000 times the intensity of diffracted solar energy was required.

A standard solution to this problem in the prior art has been to use a re-imaging system having a field stop and a Lyot stop. In this solution a separate optical system is utilized to re-image the image formed by the main telescopic optical system. A Lyot stop is utilized to block out the edges of the entrance aperture and to only allow radiation entering the aperture away from its edges to form the new image. In this manner radiation diffracted at the edges of the entrance aperture is blocked out along with the edges of the entrance aperture. The main disadvantage of this approach is that it inherently adds a significant level of complexity and weight to the original telescopic system.

The concept of apodization of an entrance aperture is known. Section 8.49 of the textbook *Modern Optics*, by Earle B. Brown, published by Reinhold Publishing Corp., 1965, defines apodization.

Apodization has been tried in the prior art to change the shape of the central maximum and also to alter the amount of radiation in the diffraction field immediately surrounding the central maximum. A major disadvantage of such classical apodization techniques is that relatively large changes are required in the transmission properties of the entrance aperture to affect the desired change in radiation in the central maximum and the diffraction field immediately surrounding the central maximum. The substantial changes in the entrance aperture resulted, in many instances, in a substantial reduction in the radiation actually utilized by the optical system. Also, there are major engineering problems in making the transmission filters required by those systems.

When the parameters and requirements of the present system were defined, apodization of the entrance aperture was considered by optical experts as a possible solution. It was concluded that apodization would not work as it was thought that too much radiation would be eliminated.

The present invention was recognized by the inventors as a practical solution to the problem as they realized that apodization of the entrance aperture to change the intensity of radiation in the outer diffraction rings far from the central maximum involves a different type of problem than apodization to change the intensity of radiation in the diffraction field immediately surrounding the central maximum.

SUMMARY OF THE INVENTION

In accordance with a preferred embodiment, a telescopic optical system is disclosed for forming an image of an object of interest which is only slightly angularly displaced in space from a second object which releases much greater intensity radiation than the object of interest. The telescopic optical system is pointed to view the object of interest with the second object not being directly in its field of view. However, radiation from the second object forms diffraction rings in the field of view, and the image of interest is positioned beyond the 100th diffraction ring. Undesired diffracted radiation from the second object is removed from the image of interest by modifying the edges of the entrance aperture of the telescopic optical system to apodize the aperture of the telescopic optical system. With the teachings of the present invention, undesired diffracted radiation is removed from the image of interest without significantly reducing the amount of radiation utilized by the system or degrading the image forming qualities of the telescopic optical system, which is a significant requirement for telescopic optical systems.

DESCRIPTION OF A PREFERRED EMBODIMENT

Figure 1:
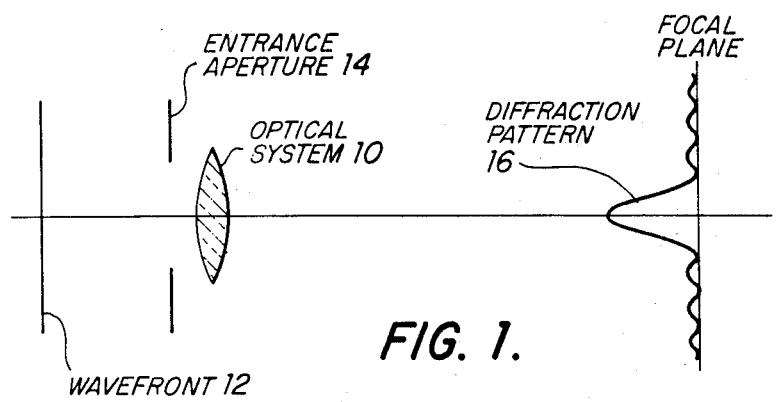
FIG. 1 illustrates the response of a typical optical system to a wavefront from a point object, and in particular shows the diffraction pattern formed in the focal plane.

FIG. 1 illustrates the response of a typical optical system 10, such as a telescopic optical system, to a wavefront 12 emanating from a point object. The optical system has structure which defines an entrance aperture 14 through which the wavefront travels. The optical system images the wavefront to a central maximum 16, and diffraction caused primarily by the edges of the entrance aperture cause the generation of a pattern of diffraction rings around the central maximum. The diffraction ring immediately adjacent to the central maximum is termed the first diffraction ring, the next ring is termed the second diffraction ring, and etc. Typically the central maximum has the most radiation in it, the first diffraction ring has the next greatest amount of radiation, and the diffraction rings have progressively less radiation as they proceed to higher orders.

For explanatory purposes, the diffraction field has been divided into a close diffraction field consisting of the first hundred diffraction rings immediately surrounding the central maximum, and a distant diffraction field consisting of diffraction rings higher than the 100th diffraction ring which are distant from the central maximum.

Figure 2:
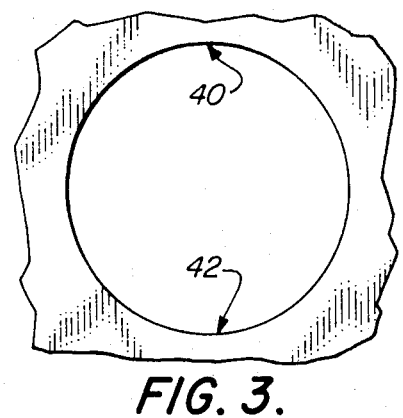
FIG. 2 illustrates a refractive telescopic optical system, and shows geometrically the problem which prompted the present invention.

FIG. 2 illustrates geometrically the problem which resulted in the present invention. A refractive telescopic optical system 20, shown schematically, has an entrance aperture 22 and a focal plane 24. The telescope is pointed at an object of interest 26, and forms an image 28 of the object, termed an image of interest, at the focal plane. The object of interest is located in space angularly very close to the sun 30. Typically the object 26 may be from 0.5° to 1.5° away from the solar limb. The geometry is such that the image of the sun 32 is physically separated from the image of interest 28, and accordingly may be blocked out as by an appropriately placed stop. Without diffraction effects there would be no problem. However, diffraction does occur and some of the solar radiation is diffracted by edges 34 of the entrance aperture onto the image of interest.

Figure 3:
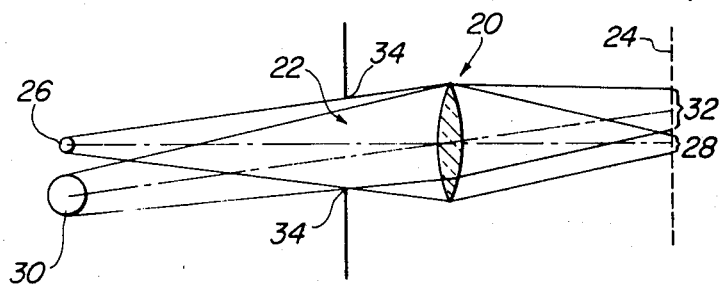
FIG. 3 shows a simple circular entrance aperture.

Referring to FIG. 3, there is illustrated a circular entrance aperture such as the system of FIG. 2 would have. The effect of diffraction is such that each edge diffracts radiation generally perpendicular to that edge. In the system of FIG. 2 the edges of the aperture which diffract solar energy onto the image of interest are the top and bottom edges 40 and 42. Accordingly, these edges are modified according to the teachings of this invention to change the diffraction pattern.

Figure 4:
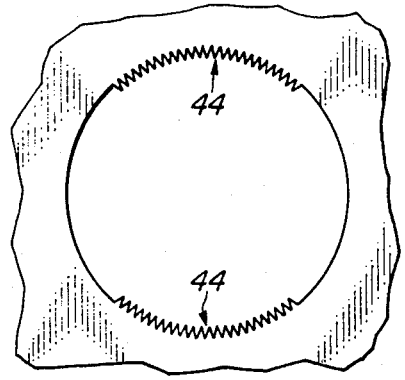
FIGS. 4 and 5 illustrate how the edges of a circular entrance aperture may be modified in accordance with the teachings of the present invention to apodize the entrance aperture.

FIG. 4 shows how the top and bottom edges of the entrance aperture may be modified to apodize the aperture in accordance with the teachings of the present invention. The intensity of the radiation diffracted onto the image of interest may be considerably reduced by introducing a saw tooth pattern 44 onto the upper and lower edges 40 and 42 of the aperture. The height and width of the saw teeth are determined by several considerations. Higher teeth redistribute the radiation more effectively, but also result in a reduction of the aperture size of the telescope, and accordingly there is a trade off between these two factors. In the problem which resulted in the present invention, it was desired that the modified edges would not result in a loss of more than 7% of the aperture size. The angle of the saw teeth, determined by the ratio of the height to the width, determines the direction in which radiation will be redistributed. In one embodiment in which the saw teeth were selected to be ½ inch high and ⅛ inch wide at the base, the radiation diffracted onto the image of interest was calculated to have been reduced by a factor of 6,000. One study has indicated that the reduction in radiation should be inversely proportional to the spacing of the teeth and a quadratic function of the height of the teeth. In the embodiment shown in FIG. 4, the saw teeth have triangular shapes. In other embodiments, the saw teeth may assume more complex shapes.

Figure 5:
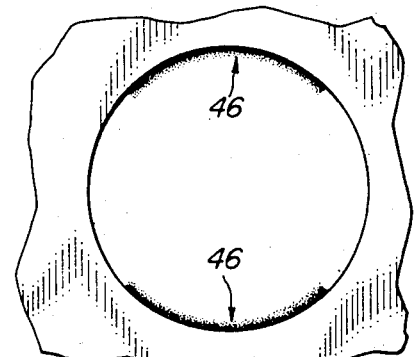

Referring to FIG. 5, there is illustrated a second embodiment of an entrance aperture modified according to the teachings of this invention. In the embodiment of FIG. 5 the edges of the aperture which run substantially horizontally have been modified such that the transmission at the wavelength of interest proceeds smoothly from zero to substantially 100%.

Figure 6:
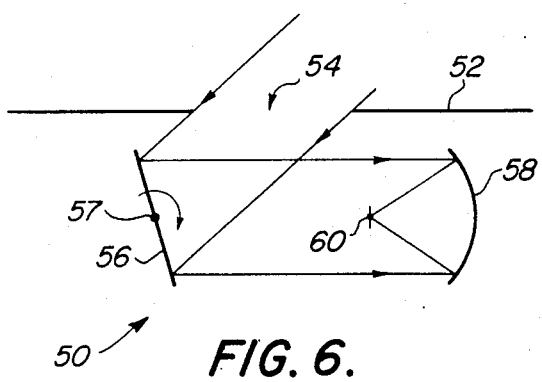
FIG. 6 illustrates a reflective telescopic optical system.

Referring to FIG. 6, there is illustrated the type of reflective, telescopic optical system 50 for which the present invention was conceived. The entire optical system 50 is located within a housing 52 which has an opening 54 through which radiation enters to the optical system. Radiation from a distant object is incident upon a scanning mirror 56, and is reflected to a primary mirror 58 which focuses the radiation at a focal plane 60. The scanning mirror 56 is rotatable about axis 57 to scan different angular segments of the field of view. In the system of FIG. 6, depending upon the angular position of scanning mirror 52, the entrance aperture may be defined by a number of edges in the system. If the scanning mirror 56 is rotated in a clockwise direction then the right edge of opening 54 will define part of the entrance aperture. On the other hand, if the mirror is rotated in a counterclockwise direction, the left edge of the opening 54 will define part of the entrance aperture. Also, the upper and lower edges of mirror 56 may define a portion of the entrance aperture if the mirror is rotated sufficiently far in either direction. Also, sensor package of some form, either electronic or photographic, will be positioned at the focal plane 60 to detect the formed image, and support structure is required to support the sensor package at the focal plane.

Figures 7, 8, 9:
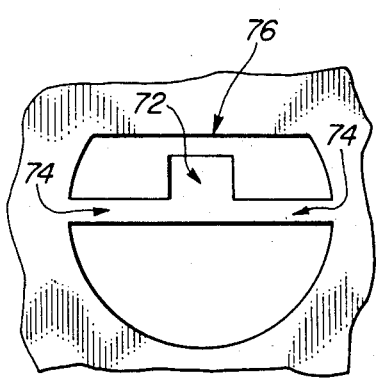
FIG. 7 shows an irregularly shaped entrance aperture which an optical system as shown in FIG. 6 might have.
FIGS. 8 and 9 illustrate how the edges of the entrance aperture of FIG. 7 may be modified in accordance with the teachings of the present invention to apodize the entrance aperture.

FIG. 7 illustrates how the entrance aperture of the optical system of FIG. 6 may be defined for a particular angular position of mirror 56. The aperture deviates from a circular entrance aperture in the following respects. A sensor package 72 partially obscures the primary mirror 58, and is supported in that position in the optical system by support structure 74. The particular angular position of mirror 56 causes the formation of one edge 76 of the entrance aperture. It is apparent that an irregularly shaped aperture has more horizontal edges to diffract radiation onto the image of interest, and accordingly presents more diffraction problems.

Applying the teachings of the present invention to the entrance aperture results in apertures as illustrated in FIGS. 8 and 9. In FIG. 8 a saw tooth pattern has been introduced along all horizontal edges of the entrance aperture to redistribute the diffraction pattern away from the image of interest. In FIG. 9, the horizontal edges of the entrance aperture have been modified such that the transmission at the wavelength of interest at each edge proceeds smoothly from zero to substantially 100%. It should be noted that this would be accomplished differently at different edges. For instance on the edges of the opening 54, the transmission characteristics of each edge will be modified to proceed smoothly from zero to substantially 100%. On the other hand, if a portion of the entrance aperture is formed by an edge of mirror 76, then the reflectance characteristics of that edge would be modified to proceed smoothly from 100% to zero percent.

In one embodiment of the invention in which an entrance aperture as shown in FIG. 7 was modified as shown in FIG. 8, the saw teeth were ½ inch high and ⅛ inch wide at the base. The radiation diffracted onto the image of interest was calculated to have been reduced by a factor of 6,000. In that embodiment, the area of the entrance aperture was effectively reduced approximately only 7%.

For explanatory purposes, the diffraction field has been divided into a close diffraction field consisting of the first hundred diffraction rings immediately surrounding the central maximum and a distant diffraction field consisting of diffraction rings higher than the 100th diffraction ring which are distant from the central maximum. According to the teachings of this invention, the entrance aperture may be apodized to substantially change the intensity of radiation diffracted onto the far diffraction field without substantially reducing the area of the entrance aperture. For the near diffraction field, the changes required in the transmission properties of the entrance aperture would likely be too substantial and would result in a too substantial reduction of radiation actually utilized by the telescopic optical system.

While several embodiments have been described, the teachings of this invention will suggest many other embodiments to those skilled in the art.

We claim:

1. A telescopic optical system for forming an image of interest of an object of interest which is only slightly angularly displaced in space from a second object which second object releases much greater intensity radiation than said object of interest, said optical system including:
   a. means for pointing said optical system to view said object of interest such that said second object is not directly in the field of view of said optical system, but wherein radiation from said second object forms diffraction rings in the field of view and wherein said image of interest is positioned beyond the 100th diffraction ring, and;
   b. means for removing undesired diffracted radiation from said second object beyond said 100th diffraction ring, said removing means including means for modifying edges of the entrance aperture of said telescopic optical system to apodize the aperture of said telescopic optical system.

2. A system as set forth in claim 1 wherein said optical system has an irregularly shaped entrance aperture.

3. A system as set forth in claim 1 wherein said means for modifying edges of the entrance aperture includes means for forming a saw tooth pattern along selected edges of the aperture.

4. A system as set forth in claim 1 wherein said means for modifying edges of the entrance aperture includes means for modifying selected edges to proceed gradually from an opaque portion to a clear portion.

5. A system as set forth in claim 1 wherein said means for modifying edges of the entrance aperture includes means for modifying selected edges to proceed gradually from a reflective portion to a non-reflective portion.

* * * * *